US011377934B1

United States Patent
Pirayeh Gar et al.

(10) Patent No.: US 11,377,934 B1
(45) Date of Patent: Jul. 5, 2022

(54) DOWNHOLE TOOL WITH COMPLIANT METAL-TO-METAL SEAL

(71) Applicant: Halliburton Energy Services, Inc., Houston, TX (US)

(72) Inventors: Shobeir Pirayeh Gar, The Colony, TX (US); Xiaoguang Allan Zhong, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/225,334

(22) Filed: Apr. 8, 2021

(51) Int. Cl.
*E21B 33/10* (2006.01)
*E21B 43/10* (2006.01)
*E21B 33/127* (2006.01)
*E21B 17/08* (2006.01)
*B33Y 80/00* (2015.01)

(52) U.S. Cl.
CPC .......... *E21B 43/106* (2013.01); *E21B 17/08* (2013.01); *E21B 33/1277* (2013.01); *B33Y 80/00* (2014.12)

(58) Field of Classification Search
CPC .. E21B 33/1212; E21B 2200/01; E21B 43/10; E21B 33/10; E21B 33/12; F16J 15/0887; F16J 15/0893; F16J 15/128; F16J 15/08
See application file for complete search history.

(56) References Cited

U.S. PATENT DOCUMENTS

| | | | | |
|---|---|---|---|---|
| 2,819,920 A | * | 1/1958 | Snyder | F16J 15/0893 277/645 |
| 5,161,806 A | * | 11/1992 | Balsells | F16J 15/027 267/1.5 |
| 5,662,341 A | * | 9/1997 | Ezell | F16J 15/0893 277/336 |
| 5,987,879 A | * | 11/1999 | Ono | F01D 9/023 60/800 |

(Continued)

FOREIGN PATENT DOCUMENTS

| CN | 101265789 A | 9/2008 |
|---|---|---|
| WO | 2009061768 A2 | 5/2009 |

OTHER PUBLICATIONS

International Search Report and Written Opinion dated Dec. 27, 2021 for corresponding PCT Application No. PCTUS2021026519 filed Apr. 9, 2021.

*Primary Examiner* — Kipp C Wallace
(74) *Attorney, Agent, or Firm* — K&L Gates LLP (57) ABSTRACT

A downhole tool including an insertion member arranged to insert into and form an annular seal with a receiving member using an annular seal assembly. The seal assembly includes a compliant metal spring and a separate metal cover overlapping at least a portion of an outside of the spring, wherein the cover and spring extend radially outward from the downhole tool so as to be compressed when the insertion member is inserted within the receiving member to form an annular metal-to-metal seal between the insertion member and the receiving member. A method of coupling the down- (Continued)

hole tool and the receiving member in a well includes inserting the insertion member of the downhole tool into the receiving member and energizing and forming an annular metal-to-metal seal by compressing the seal assembly between the insertion member and the receiving member when inserting the insertion member into the receiving member.

20 Claims, 8 Drawing Sheets

(56) References Cited

U.S. PATENT DOCUMENTS

| | | | | |
|---|---|---|---|---|
| 6,648,335 B1* | 11/2003 | Ezell | ................ | E21B 23/04 166/387 |
| 8,205,670 B2 | 6/2012 | Nelson | | |
| 8,894,070 B2 | 11/2014 | Bhat | | |
| 9,376,882 B2* | 6/2016 | Theiss | ................ | E21B 33/043 |
| 10,119,362 B2 | 11/2018 | Fripp | | |
| 2003/0209861 A1* | 11/2003 | Keene | ................ | E21B 33/1212 277/603 |
| 2004/0081599 A1* | 4/2004 | Rizzi | ................ | F16J 15/0887 422/187 |
| 2010/0078178 A1* | 4/2010 | Watson | ................ | E21B 17/08 166/380 |
| 2010/0243713 A1* | 9/2010 | Marion | ................ | F16J 15/0887 277/637 |
| 2013/0248209 A1* | 9/2013 | Watson | ................ | E21B 43/106 166/387 |
| 2015/0068774 A1* | 3/2015 | Hallundbœk | ................ | E21B 33/127 166/387 |
| 2015/0218903 A1* | 8/2015 | Sellers, Jr. | ................ | E21B 33/1212 166/380 |
| 2016/0273299 A1* | 9/2016 | Fripp | ................ | E21B 33/128 |
| 2016/0341011 A1* | 11/2016 | Steele | ................ | E21B 33/13 |
| 2016/0369587 A1* | 12/2016 | Stœhr | ................ | E21B 33/127 |
| 2018/0274300 A1* | 9/2018 | Vemuri | ................ | E21B 7/061 |
| 2018/0355693 A1 | 12/2018 | Al-Abduljabbar et al. | | |
| 2019/0203842 A1* | 7/2019 | Bidkar | ................ | F01D 11/08 |

* cited by examiner

DOWNHOLE TOOL WITH COMPLIANT METAL-TO-METAL SEAL

BACKGROUND

This section is intended to provide relevant background information to facilitate a better understanding of the various aspects of the described embodiments. Accordingly, these statements are to be read in this light and not as admissions of prior art.

In downhole conditions and at elevated temperatures, the rubber sealing components can become soft and therefore satisfactory sealing may not be always achievable resulting in leakage, particularly under high pressures; so called high pressure high temperature (HPHT) conditions. HPHT relates to wells that are hotter or higher pressure than most. For example, HPHT may be a well having an undisturbed bottomhole temperature of greater than 300° F. (150° C.) and a pore pressure of at least 0.8 psi/ft (~15.3 lbm/gal) or requiring a blowout preventer (BOP) with a rating in excess of 10,000 psi (69 MPa).

Furthermore, during the assembly and stab-in process of the seal, the linear translation of the dynamic seal can adversely affect the seal surface as well as the rubber-to-mandrel bonding and thus sealing integrity. As an example, in downhole liner hanger systems where rubber components are used to seal between a tieback liner (TBL) outside diameter and the inside diameter of a tieback receptacle (TBR), rubber seal leakage has been observed resulting in limiting the burst pressure rating of the tool. Additionally, the soft rubber seal at elevated temperatures does not provide any lateral support against buckling, thus limiting the collapse pressure rating of the tool as well. Another example of the seal integrity problem is multi closing sleeve (MCS) seals where leakage has been reported during unloading.

BRIEF DESCRIPTION OF THE DRAWINGS

Embodiments of the compliant metal-to-metal seal for downhole use are described with reference to the following figures. The same or sequentially similar numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure describes a downhole tool with a seal assembly that creates an annular metal-to-metal seal using a compliant metal spring and a separate metal cover overlapping at least a portion of the outside of the spring. The cover and spring extend radially outward from an outer cylindrical surface of the downhole tool so as to be compressed when inserted within an inner metal surface of a receiving member to energize and form the annular metal-to-metal seal against the receiving member.

This metal-to-metal seal assembly achieves a reliable seal under high temperature/high pressure applications, reduces the risk of damaging the seal during stab-in process, and at the same time enhances the collapse pressure by providing a solid support to the inner cylindrical surface wall of the receiving member, thus potentially increasing the buckling capacity. Further, when the receiving member is a steel tubular the metal-to-metal seal assembly works better at low temperature as compared to polymeric seals because the metal-to-metal seal has a similar thermal expansion coefficient as typical steel tubulars; while a rubber/polymer seal has much larger thermal expansion coefficient than typical steel tubulars.

Figure 1A:
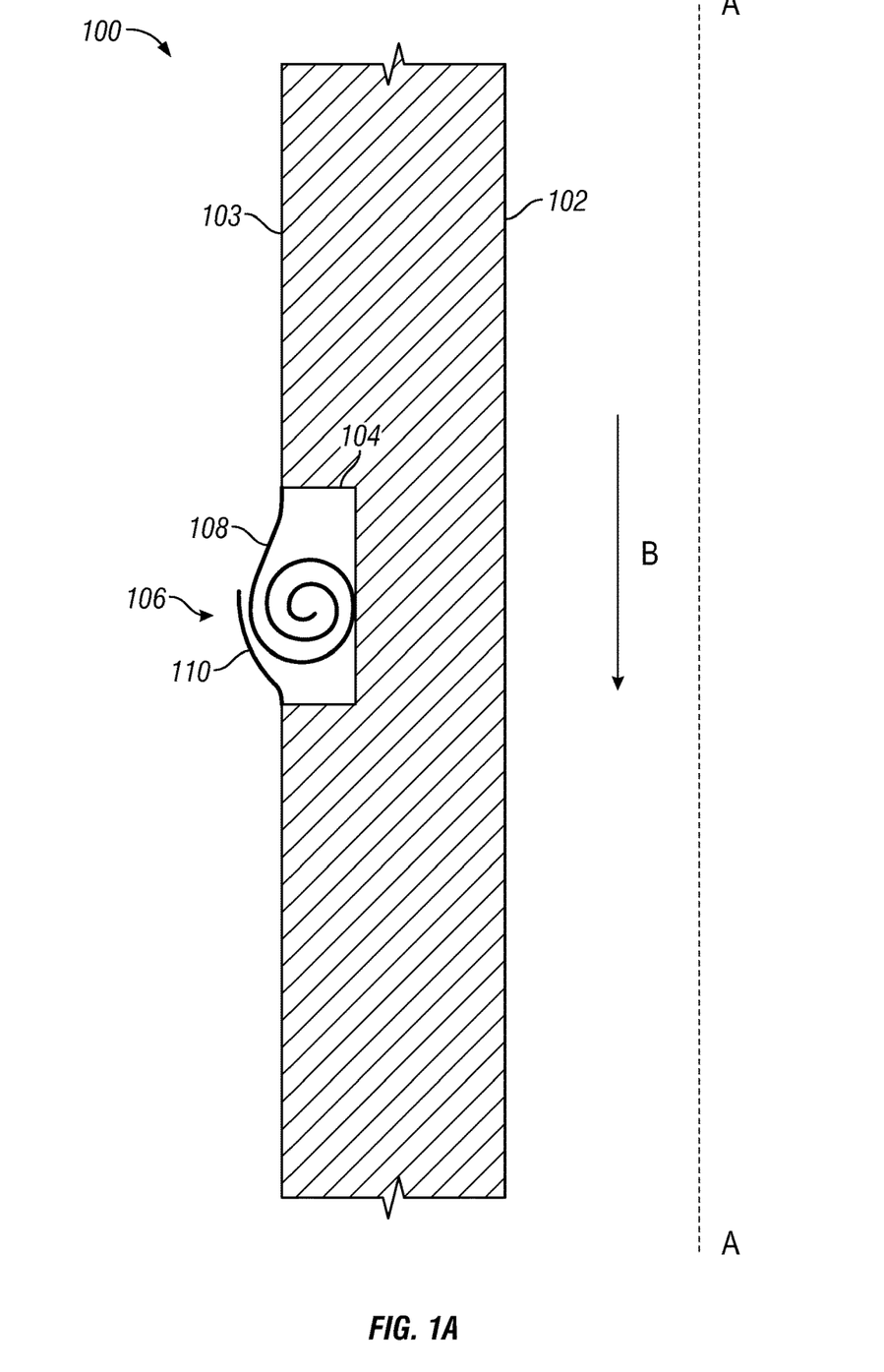
FIGS. 1A and 1B show partial cross-section views of a downhole tool with an embodiment of a seal assembly in an uncompressed and a compressed state.
Figure 1B:
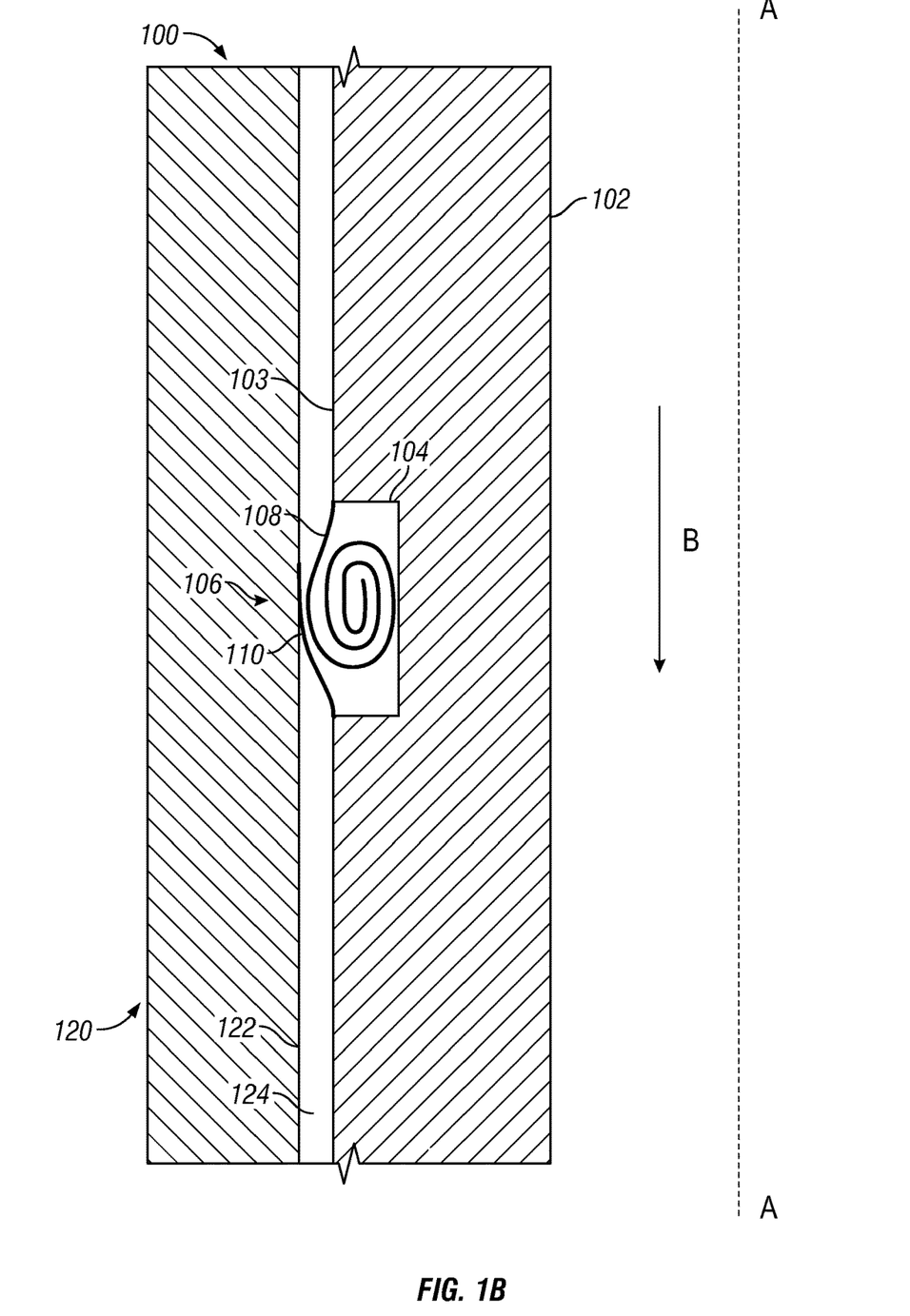

Turning now the figures, FIGS. 1A and 1B are partial cross-section views of an embodiment of a downhole tool 100 including an insertion member 102 and an annular seal assembly 106. The downhole tool 100 is configured so as to be able to insert the insertion member 102 into and form an annular seal with a receiving member 120 in the direction of arrow B shown in FIG. 1B. In FIGS. 1A and 1B, the direction B is in the downhole direction and the downhole tool 100 will be described with the downhole direction. However, it should be appreciated that the stab-in can also be in the opposite, or uphole direction as well with a corresponding change in the orientation of the seal assembly. The insertion member 102 is also only shown in partial cross-section view with a dotted centerline A-A. It should be appreciated that the insertion member 102 may be or be part of any downhole tool for stabbing into the receiving member 120 and may be a mandrel or tubular in shape with a circumferential outer surface 103.

In addition to the insertion member 102, the downhole tool 100 also includes the seal assembly 106, which includes a compliant metal spring 108 as well as a separate metal cover 110 overlapping at least a portion of the outside of the spring 108. Although shown in partial cross-section, the seal assembly 106 extends around the circumference of the insertion member 102.

The spring 108 is further configured in a spiral oriented around a center that extends circumferentially around the insertion member. The spring 108 is made of a compliant metal but the specific type of metal and the dimensions of the spring 108 depend on the distance between the insertion member 102 and the inner surface 122 of the receiving member 120, the pressures that need to be sealed, and the environment in which the seal needs to be effected. The spring 108 is manufactured by rolling and welding the spring layers together. However, alternative methods of manufacturing, such as 3D printing using additive manufacturing, may also be used.

The metal cover 110 is separate from the spring 108 and further configured as a ring or annular flap that overlaps at least an outer portion of the spring 108. By overlapping the spring 108, the metal cover 110 provides a metal sealing surface to form a metal-to-metal seal against the inner surface 122 of the receiving member 120 energized by the spring 108. The metal cover 110 material may be any suitable metal and, as with the spring 108, As with the spring 108, the specific type of metal and the dimensions of the metal cover 110 depend on the distance between the insertion member 102 and the inner surface 122 of the receiving member 120, the pressures that need to be sealed, and the environment in which the seal needs to be effected.

The insertion member 102 also includes an annular groove 104 around the outer surface 103 of the insertion member 102, in which the spring 108 is located. When manufactured and not in use as shown in FIG. 1A, the spring 108 and the metal cover 110 are sized to extend radially outward from the downhole tool 100 so as to extend past the outer surface 103 of the insertion member 102. There is not any squeezing or compactness applied to the spring 108. Further, the metal cover 110 is connected to the downhole end of the groove 104 and the spring 108 is connected to the uphole end of the groove 104. However, it should be appreciated that the metal cover 110 extends from the end being inserted and in a direction opposite that of the insertion, whichever direction that may be.

In manufacturing the downhole tool 100, the tail of the spring 108 will be complete joint penetration (CJP) welded to the edge of the groove 104 from one side. The metal cover 110 is attached to the groove 104 similarly. If additive manufacturing (3D printing) is used however, the spring 108, the metal cover 110, and the groove 104 are made altogether as the seal assembly 106 with no mechanical connection. The seal assembly 106 is then attached to the insertion member 102, such as by welding or other attachment means.

As shown in FIG. 1B, the downhole tool 100 is coupled with the receiving member 120 by inserting the insertion member 102 into the receiving member 120. When the insertion member 102 is inserted into the receiving member 120, the clearance between the insertion member 102 and the receiving member 120 creates an annulus 124 with a clearance that is less than the amount the seal assembly 106 extends out past the outer surface 103. Therefore, the seal assembly 106 is compressed when the insertion member 102 is inserted into the receiving member 120, thereby squeezing the spring 108 and energizing and forming the annular metal-to-metal seal against the inner surface 122 of the receiving member 120.

Figure 2:
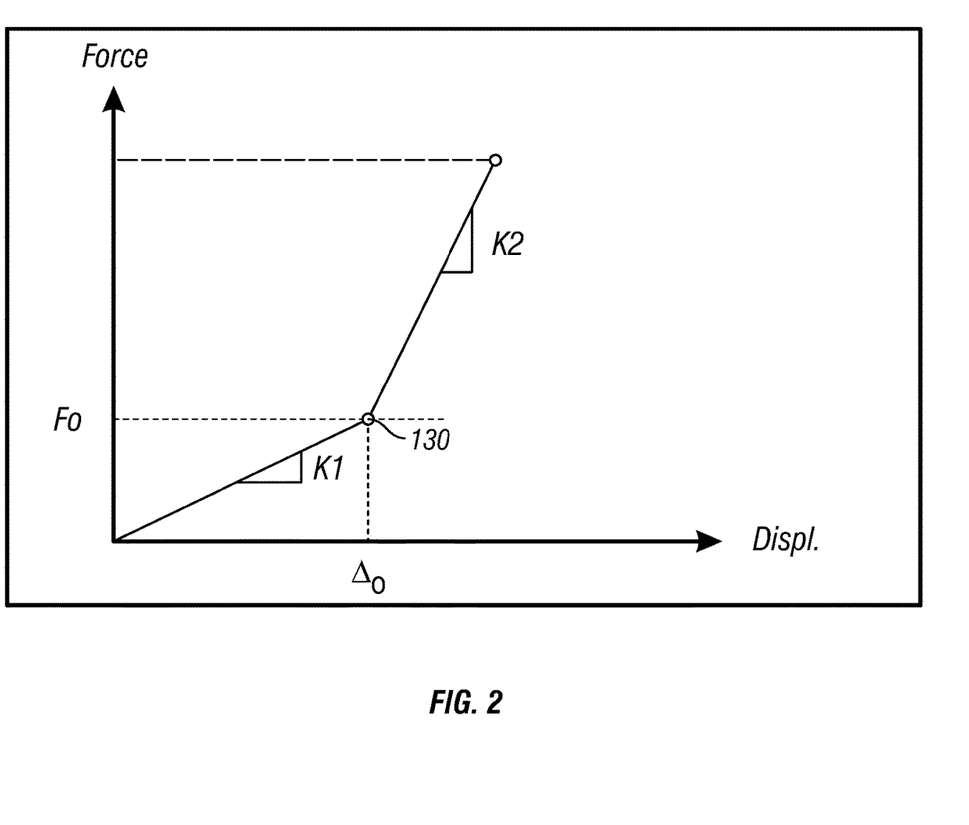
FIG. 2 is a graph of the force displacement of the seal assembly of FIGS. 1A and 1B.

As the seal assembly 106 is inserted, the spring 108 is squeezed and becomes compacted and stiffens. FIG. 2 shows a displacement-stiffness graph of the spring 108. The initial slope K1 shows the stiffness against compactness up until the insertion member 102 is inserted into the receiving member 120, which is shown as assembly point 130 at $F_0$ and $\Delta_0$. Upon assembly, the spring 108 will be squeezed and become compacted and stiffer, as shown by the slope K2 after the assembly point 130 that has a higher slope K2 than the stiffness slope K1 before assembly. The increase in the stiffness of the spring 108 after the initial assembly helps to enhance the sealing integrity of the seal assembly 106 and also provides support for the receiving member 120 under collapse pressure. As described above, the force-displacement relationship or stiffness of the spring 108 can be controlled by material selection and geometry of the spring 108, such as thickness, curvature, and number of rolls based on the distance between the insertion member 102 and the inner surface 122 of the receiving member 120, the pressures that need to be sealed, and the environment in which the seal needs to be effected. Thus, the required force for assembly of the insertion member 102 into the receiving member 120 is a parameter that can be controlled by the design of the spring 108.

Figure 3:
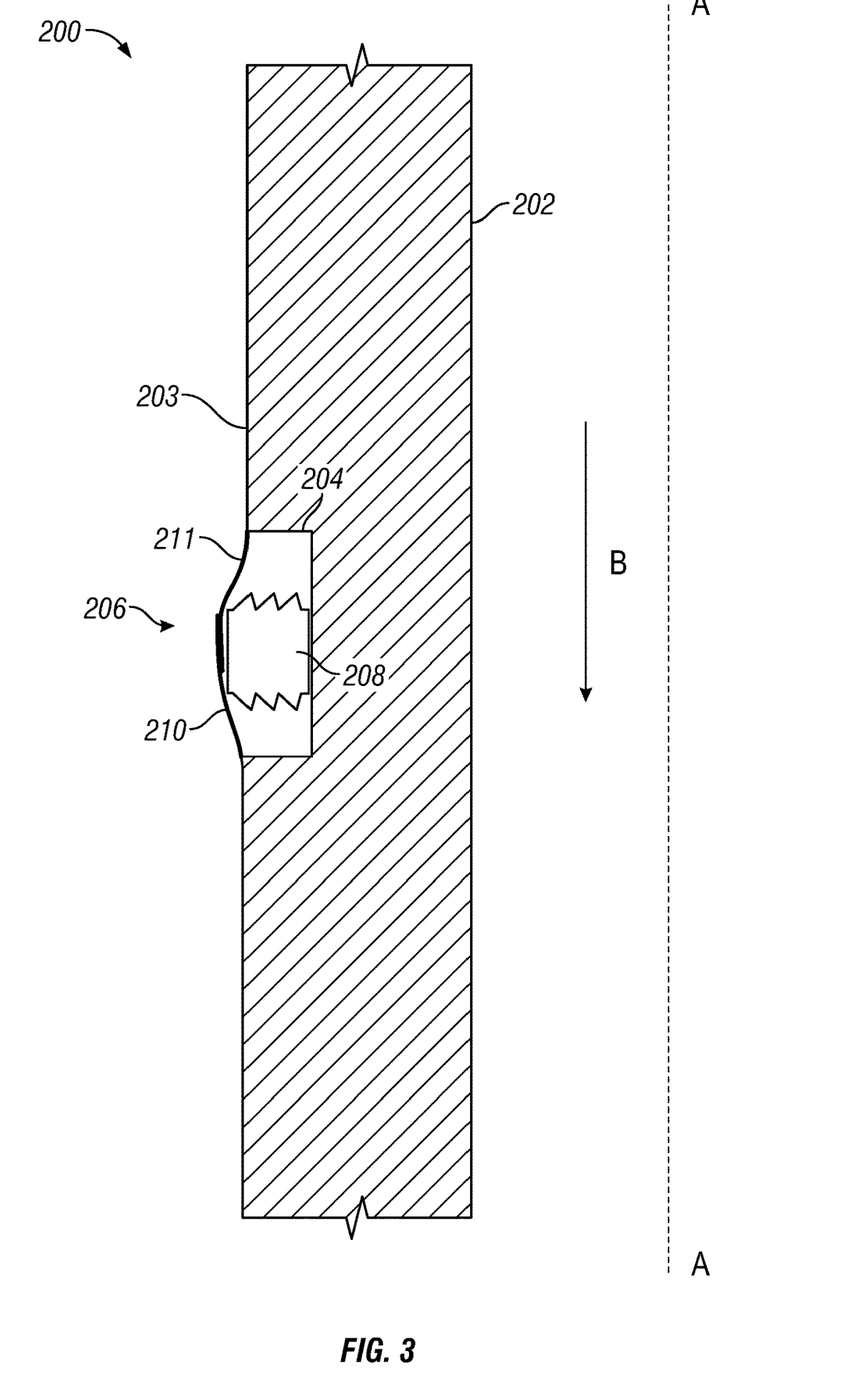
FIG. 3 is a partial cross-section view of an alternative embodiment of a downhole tool with a seal assembly.

FIG. 3 is partial cross-section views of a second embodiment downhole tool 200 including an insertion member 202 and a seal assembly 206. As shown, there are similar parts as the downhole tool 100 that are given similar reference numbers and for efficiency may not be described in as much detail as with the discussion of the downhole tool 100. Similar to the downhole tool 100, the downhole tool 200 is configured so as to be able to insert the insertion member 202 into and form an annular seal with a receiving member 220 in the direction of arrow B.

In addition to the insertion member 202, the downhole tool 200 also includes the seal assembly 206, which includes a compliant metal spring 208 as well as a separate metal cover 210 overlapping at least a portion of the outside of the spring 208. Although shown in partial cross-section, the seal assembly 206 extends around the circumference of the insertion member 202.

Like the spring 108 from the downhole tool 100, the spring 208 is made of a compliant metal but the specific type of metal and the dimensions of the spring 108 depend on the distance between the insertion member 202 and the inner surface of the receiving member (not shown), the pressures that need to be sealed, and the environment in which the seal needs to be effected. However, unlike the spring 108, the spring 208 is not formed in a spiral but is instead a bellows spring extending circumferentially around the insertion member 202 with a direction of compression being in the radial direction relative to the insertion member 202.

The metal cover 210 is similar to the separate metal cover 110 in that the metal cover separate metal cover 210 is separate from the spring 208 and further configured as a ring or annular flap that overlaps at least an outer portion of the spring 208. By overlapping the spring 208, the metal cover 210 provides a metal sealing surface to form a metal-to-metal seal against the inner surface of the receiving member energized by the spring 208. However, the seal assembly 206 also includes a separate second metal cover 211 that is configured similarly as the first metal cover 210. In addition to overlapping a portion of the spring 208, the first metal cover 210 also overlaps at least a portion of the second metal cover 211. In this way the first metal cover 210 still provides the metal sealing surface for the metal-to-metal seal and the first metal cover 210 and second metal cover 211 also overlap each other for providing integrity to the seal.

The insertion member 202 also includes an annular groove 204 around the outer surface 203 of the insertion member 202, in which the spring 208 is located. When manufactured and not in use as shown in FIG. 3, the spring 208, the first metal cover 210, and the second metal cover 211 are sized to extend radially outward from the downhole tool 200 so as to extend past the outer surface 203 of the insertion member 202. There is not any squeezing or compactness applied to the spring 208. Further, the first metal cover 210 is connected to the downhole end of the groove 204 and the second metal cover 211 is connected to the uphole end of the groove 204. However, it should be appreciated that the first metal cover 210 extends from the end being inserted and in a direction opposite that of the insertion, whichever direction that may be.

In manufacturing the downhole tool 200, the first metal cover 210 and the second metal cover 211 will be complete joint penetration (CJP) welded to the edge of the groove 204. Both ends of the bellows spring are mechanically connected, either through weld or other means, to form a circumferentially continuous spring. However, if additive manufacturing (3D printing) is used however, the first metal cover 210, second metal cover 211, and the groove 204 are made altogether as the seal assembly 206 with no mechanical connection. The seal assembly 206 is then attached to the insertion member 202, such as by welding or other attachment means.

Similar to the downhole tool 100 shown in FIG. 1B, the downhole tool 200 is coupled with a receiving member by inserting the insertion member 202 into the receiving member. When the insertion member 202 is inserted into the receiving member, the clearance between the insertion member 202 and the receiving member creates an annulus with a clearance that is less than the amount the seal assembly 206 extends out past the outer surface 203. Therefore, the seal assembly 206 is compressed when the insertion member 202 is inserted into the receiving member, thereby squeezing the spring 208 and energizing and forming the annular metal-to-metal seal against the inner surface of the receiving member.

Similar to the seal assembly 106, as the seal assembly 206 is inserted, the spring 208 is squeezed and becomes compacted and stiffens upon assembly of the coupling between the downhole tool 100 and the receiving member. The increase in the stiffness of the spring 208 after the initial assembly helps to enhance the sealing integrity of the seal assembly 206 and also provides support for the receiving member under collapse pressure. As described above, the displacement-stiffness of the spring 208 can be controlled by material selection and geometry of the spring 208 based on the distance between the insertion member 202 and the inner surface of the receiving member, the pressures that need to be sealed, and the environment in which the seal needs to be effected. Thus, the required force for assembly of the insertion member 202 into the receiving member is a parameter that can be controlled by the design of the spring 208.

It should be appreciated that the downhole tool may be any downhole tool needing an annular seal. For example, the downhole tool may be used in a tieback liner (TBL) that is part of a liner hanger tieback system where the tieback liner is stabbed into a receptacle of a liner string. Another example is a sleeve valve with a seal experiencing relative linear movement upon the opening and closing of the valve.

FIGS. 4-6B show schematic cross-sections of an example of a downhole tool 400 being used in a borehole including a well structure 431. More specifically, the downhole tool 400 is used in a tieback liner (TBL) that is part of a liner hanger tieback system where the tieback liner is stabbed into a receptacle of a liner string.

Figure 4:
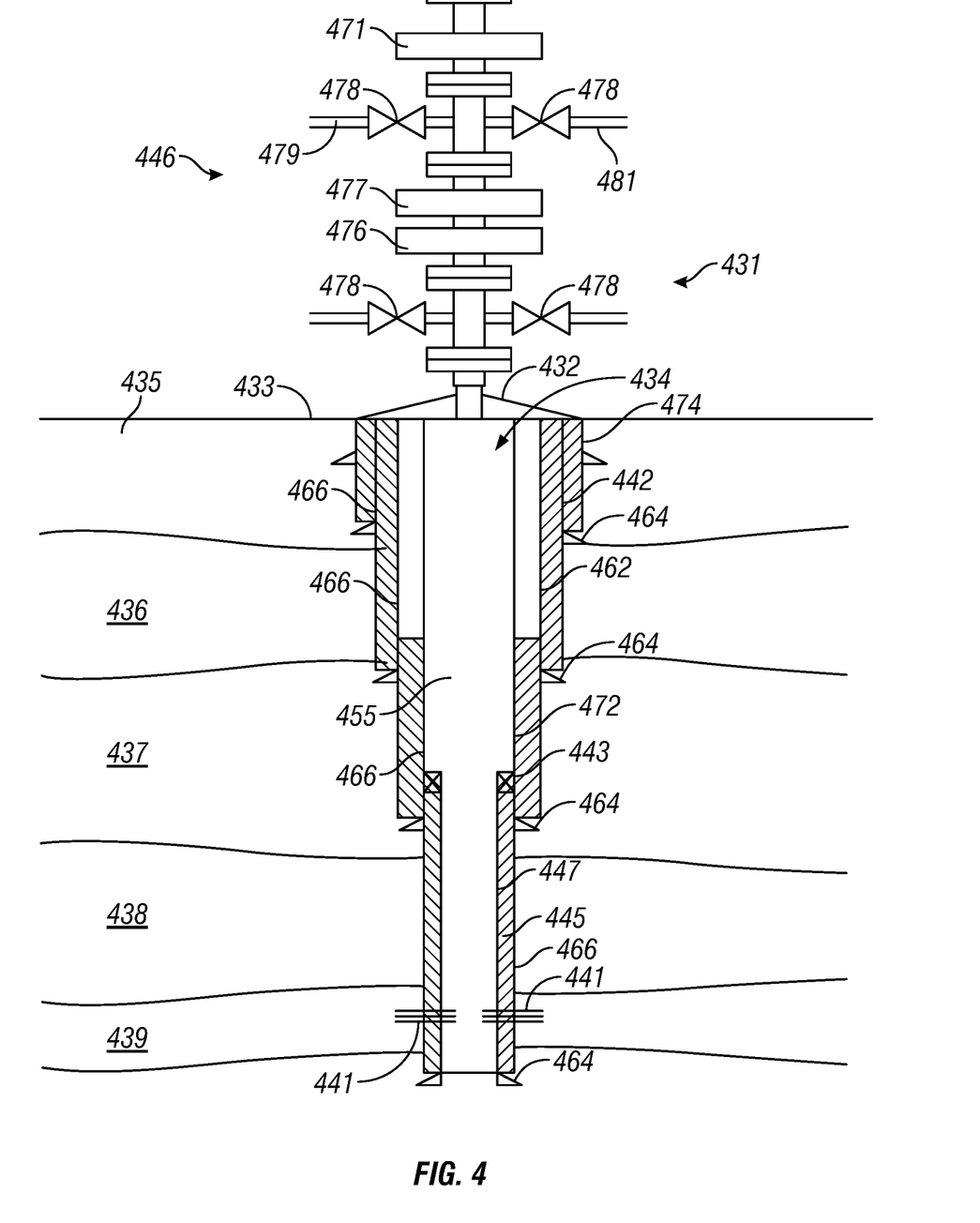
FIG. 4 shows a schematic cross-section of a borehole including a well structure.

FIG. 4 schematically shows an example of a conventionally cased well structure 431. The well structure 431 comprises a borehole 434 which has been drilled from the surface 433 through a number of Earth formations 435, 436, 437, 438 up to a production formation 439 which may comprise hydrocarbons. The well structure 431 is lined with a number of nested casings 442, 462, 472 and a liner 445 which is suspended from the inner casing 472 by means of liner hanger 443. The casings may be arranged within conductor pipe 474 having a relatively large inner diameter. Each casing 442, 462, 472 extends further into the borehole 434 than the corresponding previous casing or pipe. The liner 445 may extend from the inner casing 472 to the production formation 439 and has been provided with perforations 441 to allow fluid communication from the production formation 439 to the borehole 434.

The outer casing 442 may also be referred to as surface casing. The casing 462 that is arranged within the surface casing may also be referred to as intermediate casing. The well structure 431 may be provided with one or more intermediate casing strings. The inner casing 472 may also be referred to as the production casing. The liner 445 may be referred to as production liner, as it is set across the production formation 439 and perforated to provide communication with the wellbore and a production conduit (not shown). The production casing 472 is typically required to be able to withstand pressures of the production formation 439, i.e., the production casing preferably has a burst strength and/or a collapse strength which is able to withstand the (gas) pressure in the production formation 439 along its entire length.

The liner hanger 443 is a device used to attach or hang liners from the internal wall of a previous casing string. The liner hanger 443 may be designed to secure in place the liner 445 and to isolate the interior space 455 of the production casing 472 from the annular space 447 of the production liner 445. For example, the liner hanger 443 comprises means for securing itself against the wall of the casing 472, such as a slip arrangement, and means for establishing a reliable hydraulic seal to isolate the interior space 455, for instance by means of an expandable elastomeric element.

The conductor pipe 474, the casings 442, 462, 472 and the liner 445 all may be provided with a corresponding casing shoe 464. The annulus between a respective casing and the previous casing has typically been filled with a material 466 such as cement, either partially or fully.

A wellhead or casing head 432 may cover the surface ends of the casings 442, 462, 472 and the conductor pipe 474. During drilling, a blowout preventer (BOP) 446 is installed on the wellhead 432 to enable control of the wellbore and for fluid flow in and out of the borehole 434. The BOP 446 may be provided with one or more rams, such as blind ram 476 and pipe ram 477, an annular blow out preventer 471 and one or more valves 478 to connect to pipelines. The latter typically include one or more of a choke line, kill line 479, flow line 481.

Figure 5:
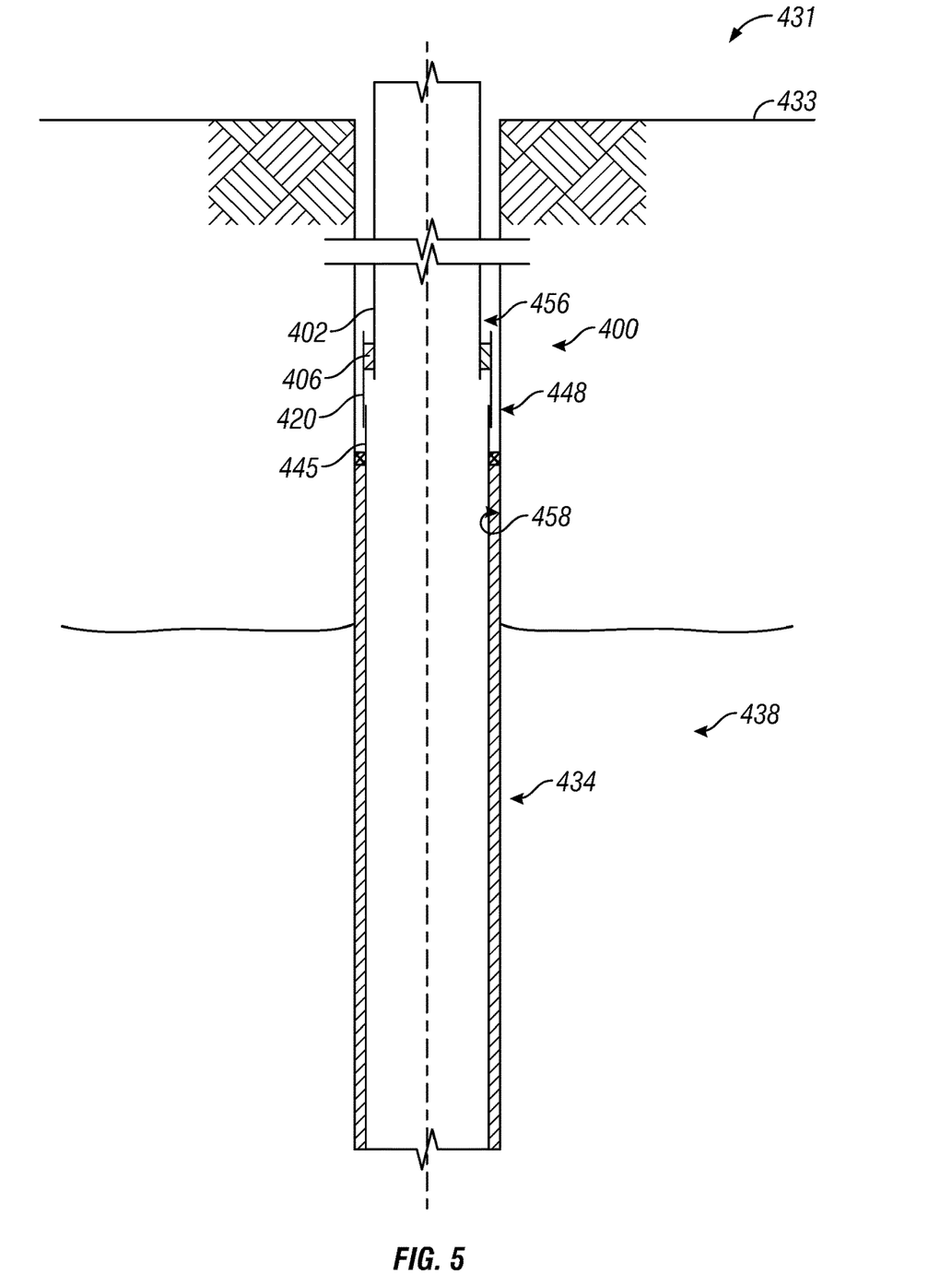
FIG. 5 shows a schematic cross-section view of a portion of the well structure.

FIG. 5 is a schematic partial cross-sectional side view of the well structure 431 that has been modified for clarity to focus on the liner 445 extending through Earth formation 438. The well structure 431 includes a cylindrical borehole 434 extending from a surface 433 downward into the Earth into one or more subterranean Earth formations 438 of interest (one shown). Although the borehole 434 is shown extending vertically, the concepts herein are applicable to many other different configurations of boreholes, including horizontal, slanted, or otherwise deviated boreholes. The well structure 431 also includes a liner hanger tieback system 448, which includes the liner 445, or casing, defined by lengths of tubing lining a portion of the borehole 434. The liner hanger tieback system 448 includes a metal bore receptacle 420 connected to the liner 445 at a top, uphole end of the liner 445. A tieback liner 402 is shown as having been lowered from the surface 433 into the borehole 434, and seals to the bore receptacle 420 with a seal assembly 406, which can be either seal assembly 106 or seal assembly 206 described above. Although FIG. 5 shows a borehole annulus 456 between the tieback liner 402 and an inner wall 458 of the casing 472 as empty, the borehole annulus 456 can include cement, for example, following a cementing operation.

Figure 6A:
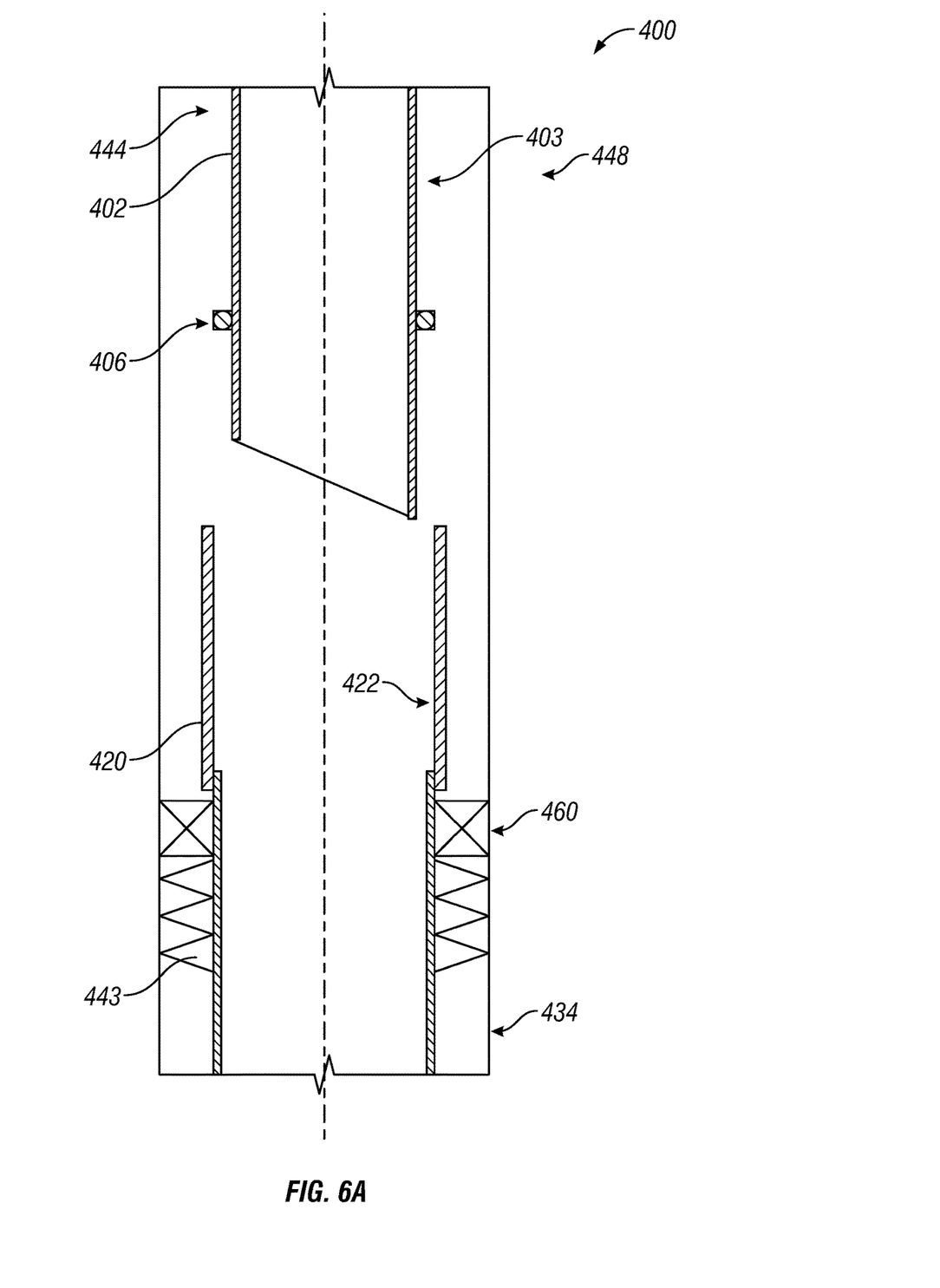
FIGS. 6A and 6B show a schematic cross-section view of a liner hanger tieback system for the well structure with the tieback liner being stabbed into the receptacle.
Figure 6B:
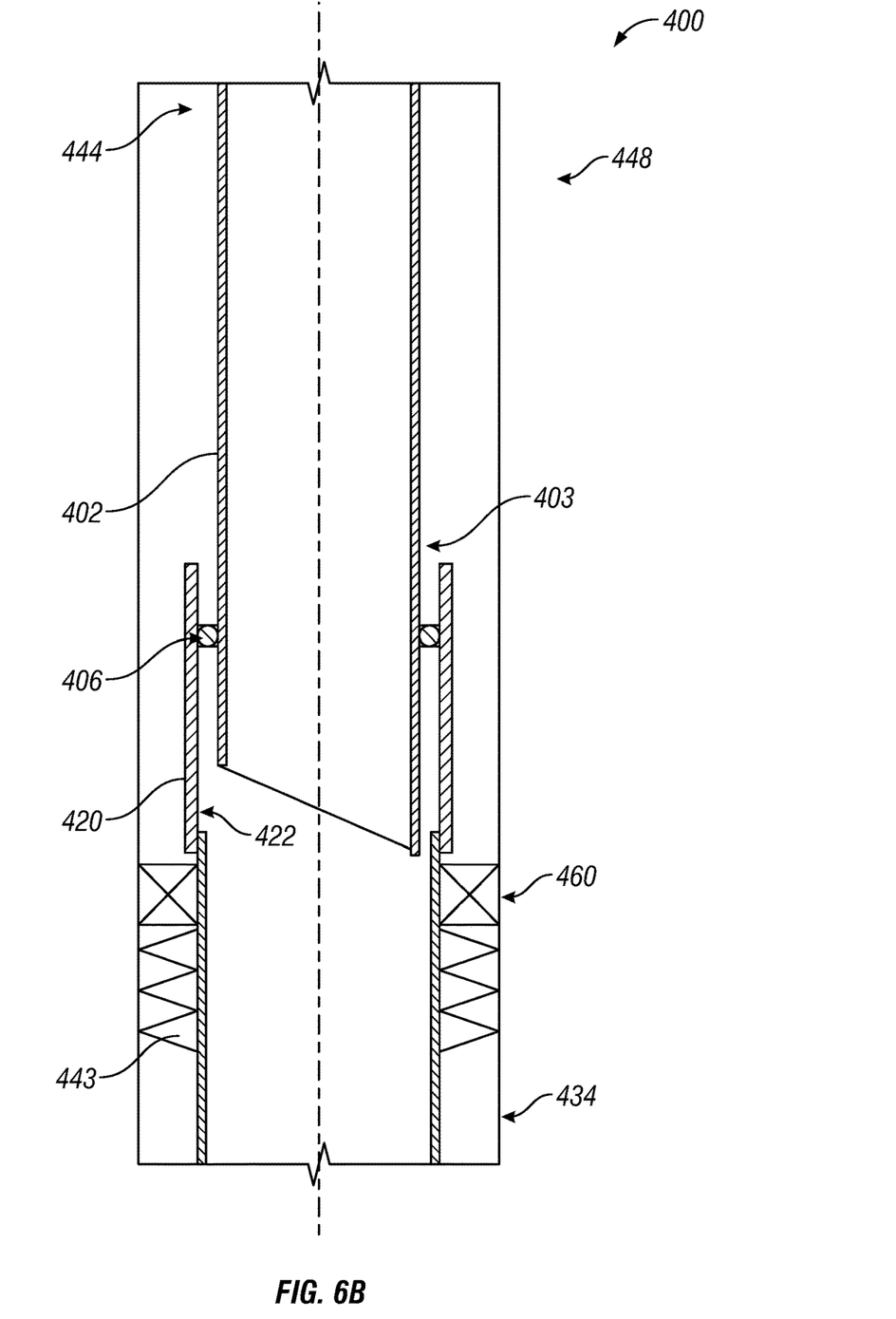

FIGS. 6A and 6B are schematic cross-sectional side views of the liner hanger tieback system 448 in borehole 434. The example liner hanger tieback system includes a liner hanger 443 for the liner 445 of FIG. 5, and attaches to the inner wall 458 of the casing 472 with a packer element 460. The liner hanger 443 may be cemented in place or supported by the packer element 460 and floating, or not cemented. The metal receptacle 420 is engaged with the liner hanger 443 at a top, uphole end of the liner hanger 443, for example, by means of threading. The receptacle 420 can include a variety of forms. For example, the receptacle 420 can include a polished bore receptacle (PBR), a tieback receptacle (TBR), or another type of bore receptacle.

The liner hanger tieback system 448 includes a tieback liner 402 positioned within the bore receptacle 420. For example, a portion of an outer surface 403 of the tieback liner 402 is positioned adjacent to, and not directly contacting, an inner surface 422 of the bore receptacle 420.

A seal assembly 406 disposed between the tieback liner 402 and the bore receptacle 420 seals a space between the portion of the outer surface 403 of the tieback liner 402 and the inner surface 422 of the bore receptacle 420. The seal system 406 may be either of the seal assembly 106 or the seal assembly 206 discussed above. As discussed above, the seal assembly 406 is connected, or fixed, to the tieback liner 402 as it is run downhole, and the seal assembly 406 engages with the bore receptacle 420 when the tieback liner 402 is positioned downhole. The seal assembly 406 engages and seals to the bore receptacle 420, particularly to the inner surface 422 of the bore receptacle 420, when the tieback liner 402 is lowered in the borehole 434 and positioned partially within the bore receptacle 420 to compress the spring 108 or the spring 208 to energize and form the metal-to-metal seal. The seal assembly 406 thus seals the space between the tieback liner 402 and the bore receptacle 420 from fluid communication between the central bore of the liner hanger tieback system 448 and the wellbore annulus 444.

Further examples of the above embodiments include:

Example 1 is a downhole tool comprising an insertion member configured to insert into and form an annular seal with a receiving member, the downhole tool comprising an annular seal assembly configured to form the annular seal and comprising: a compliant metal spring; and a separate metal cover overlapping at least a portion of an outside of the spring; wherein the cover and spring extend radially outward from the downhole tool so as to be compressed when the insertion member is inserted within the receiving member to form an annular metal-to-metal seal between the insertion member and the receiving member.

In Example 2, the embodiments of any preceding paragraph or combination thereof further include wherein the spring and the metal cover extend around a circumference of the insertion member and the spring comprises a spiral oriented around a center extending circumferentially around the insertion member In Example 3, the embodiments of any preceding paragraph or combination thereof further include wherein a thickness and a geometry of the spring are selected based on a distance between an outer surface of the seal assembly and an inner surface of the receiving member.

In Example 4, the embodiments of any preceding paragraph or combination thereof further include wherein the insertion member further comprises an annular groove around an outer surface in which the spring is located.

In Example 5, the embodiments of any preceding paragraph or combination thereof further include wherein cover is connected to a downhole end of the groove and the spring is connected to an uphole end of the groove.

In Example 6, the embodiments of any preceding paragraph or combination thereof further include wherein the cover and the spring are formed by additive manufacturing.

In Example 7, the embodiments of any preceding paragraph or combination thereof further include wherein the spring comprises a bellows spring and further comprising another separate cover positioned so that the covers overlap.

In Example 8, the embodiments of any preceding paragraph or combination thereof further include wherein the downhole tool comprises a tieback liner and the receiving member comprises a receptacle of a liner.

Example 9 is a method of coupling a downhole tool and a receiving member in a well, the method comprising: inserting an insertion member of the downhole tool into the receiving member, the downhole tool comprising a seal assembly being annular and comprising a compliant metal spring and a separate metal cover overlapping at least a portion of an outside of the spring; and energizing and forming an annular metal-to-metal seal by compressing the seal assembly between the insertion member and the receiving member when inserting the insertion member into the receiving member.

In Example 10, the embodiments of any preceding paragraph or combination thereof further include wherein the spring and the metal cover extend around a circumference of the insertion member and the spring comprises a spiral oriented around a center extending circumferentially around the insertion member.

In Example 11, the embodiments of any preceding paragraph or combination thereof further include wherein a thickness and a geometry of the spring are selected based on a distance between an outer surface of the seal assembly and an inner surface of the receiving member.

In Example 12, the embodiments of any preceding paragraph or combination thereof further include wherein the insertion member further comprises an annular groove around an outer surface in which the spring is located.

In Example 13, the embodiments of any preceding paragraph or combination thereof further include wherein cover is connected to a downhole end of the groove and the spring is connected to an uphole end of the groove.

In Example 14, the embodiments of any preceding paragraph or combination thereof further include wherein the spring comprises a bellows spring and further comprising another separate cover positioned so that the covers overlap.

In Example 15, the embodiments of any preceding paragraph or combination thereof further include wherein the downhole tool comprises a tieback liner and the receiving member comprises a receptacle of a liner.

Example 16 is well structure for a well, comprising: a liner located in the well using a liner hanger, the liner hanger comprising a metal receptacle; and a tieback liner inserted into the receptacle and comprising a seal assembly, the seal assembly being annular and comprising a compliant metal spring and a separate metal cover overlapping at least a portion of an outside of the spring, the cover and spring extending radially outward from the tieback liner so as to be compressed when the tieback liner is inserted within the receptacle to form an annular metal-to-metal seal between the tieback liner and the receptacle.

In Example 17, the embodiments of any preceding paragraph or combination thereof further include wherein the spring and the metal cover extend around a circumference of the tieback liner and the spring comprises a spiral oriented around a center extending circumferentially around the tieback liner.

In Example 18, the embodiments of any preceding paragraph or combination thereof further include wherein a thickness and a geometry of the spring are selected based on a distance between an outer surface of the seal assembly and an inner surface of the receptacle.

In Example 19, the embodiments of any preceding paragraph or combination thereof further include wherein the tieback liner further comprises an annular groove around an outer surface in which the spring is located.

In Example 20, the embodiments of any preceding paragraph or combination thereof further include wherein the spring comprises a bellows spring and further comprising another separate cover positioned so that the covers overlap.

Certain terms are used throughout the description and claims to refer to particular features or components. As one skilled in the art will appreciate, different persons may refer to the same feature or component by different names. This document does not intend to distinguish between components or features that differ in name but not function.

For the embodiments and examples above, a non-transitory computer readable medium can comprise instructions stored thereon, which, when performed by a machine, cause the machine to perform operations, the operations comprising one or more features similar or identical to features of methods and techniques described above. The physical structures of such instructions may be operated on by one or more processors. A system to implement the described algorithm may also include an electronic apparatus and a communications unit. The system may also include a bus, where the bus provides electrical conductivity among the components of the system. The bus can include an address bus, a data bus, and a control bus, each independently configured. The bus can also use common conductive lines for providing one or more of address, data, or control, the use of which can be regulated by the one or more processors. The bus can be configured such that the components of the system can be distributed. The bus may also be arranged as part of a communication network allowing communication with control sites situated remotely from system.

In various embodiments of the system, peripheral devices such as displays, additional storage memory, and/or other control devices that may operate in conjunction with the one or more processors and/or the memory modules. The peripheral devices can be arranged to operate in conjunction with display unit(s) with instructions stored in the memory module to implement the user interface to manage the display of the anomalies. Such a user interface can be operated in conjunction with the communications unit and the bus. Various components of the system can be integrated such that processing identical to or similar to the processing schemes discussed with respect to various embodiments herein can be performed.

While compositions and methods are described herein in terms of "comprising" various components or steps, the compositions and methods can also "consist essentially of" or "consist of" the various components and steps.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques accepted by those skilled in the art.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A downhole tool comprising an insertion member configured to insert into and form an annular seal with a receiving member, the downhole tool comprising an annular seal assembly configured to form the annular seal and comprising:
   a compliant metal spring; and
   a separate metal cover overlapping at least a portion of an outside of the spring, wherein one end of the cover is fixedly connected to or integral with the insertion member;
   wherein the cover and the spring extend radially outward from the downhole tool so as to be compressed when the insertion member is inserted within the receiving member to form an annular metal-to-metal seal between the insertion member and the receiving member.

2. The downhole tool of claim 1, wherein the spring and the metal cover extend around a circumference of the insertion member, the spring comprises a spiral oriented around a center extending circumferentially around the insertion member, and the spiral decreases in diameter approaching the center.

3. The downhole tool of claim 2, wherein a thickness and a geometry of the spring are selected based on a distance between an outer surface of the seal assembly and an inner surface of the receiving member.

4. The downhole tool of claim 1, wherein the insertion member further comprises an annular groove around an outer surface in which the spring is located.

5. The downhole tool of claim 4, wherein the cover is fixedly connected to or integral with a downhole end of the groove and the spring is fixedly connected to or integral with an uphole end of the groove.

6. The downhole tool of claim 1, wherein the cover and the spring are formed by additive manufacturing.

7. The downhole tool of claim 1, wherein the spring comprises a bellows spring and further comprising another separate cover positioned so that the covers overlap.

8. The downhole tool of claim 1, wherein the downhole tool comprises a tieback liner and the receiving member comprises a receptacle of a liner.

9. A method of coupling a downhole tool and a receiving member in a well, the method comprising:
   inserting an insertion member of the downhole tool into the receiving member, the downhole tool comprising a seal assembly being annular and comprising a compliant metal spring and a separate metal cover overlapping at least a portion of an outside of the spring, wherein one end of the cover is fixedly connected to or integral with the insertion member; and
   energizing and forming an annular metal-to-metal seal by compressing the seal assembly between the insertion member and the receiving member when inserting the insertion member into the receiving member.

10. The method of claim 9, wherein the spring and the metal cover extend around a circumference of the insertion member, the spring comprises a spiral oriented around a center extending circumferentially around the insertion member, and the spiral decreases in diameter approaching the center.

11. The method of claim 9, wherein a thickness and a geometry of the spring are selected based on a distance between an outer surface of the seal assembly and an inner surface of the receiving member.

12. The method of claim 9, wherein the insertion member further comprises an annular groove around an outer surface in which the spring is located.

13. The method of claim 12, wherein the cover is fixedly connected to or integral with a downhole end of the groove and the spring is fixedly connected to or integral with an uphole end of the groove.

14. The method of claim 9, wherein the spring comprises a bellows spring and further comprising another separate cover positioned so that the covers overlap.

15. The method of claim 9, wherein the downhole tool comprises a tieback liner and the receiving member comprises a receptacle of a liner.

16. A well structure for a well, comprising:
 a liner located in the well using a liner hanger, the liner hanger comprising a metal receptacle; and
 a tieback liner inserted into the receptacle and comprising a seal assembly, the seal assembly being annular and comprising a compliant metal spring and a separate metal cover overlapping at least a portion of an outside of the spring, wherein one end of the cover is fixedly connected to or integral with the tieback liner, the cover and the spring extending radially outward from the tieback liner so as to be compressed when the tieback liner is inserted within the receptacle to form an annular metal-to-metal seal between the tieback liner and the receptacle.

17. The well structure of claim 16, wherein the spring and the metal cover extend around a circumference of the tieback liner, the spring comprises a spiral oriented around a center extending circumferentially around the tieback liner, and the spiral decreases in diameter approaching the center.

18. The well structure of claim 17, wherein a thickness and a geometry of the spring are selected based on a distance between an outer surface of the seal assembly and an inner surface of the receptacle.

19. The well structure of claim 16, wherein the tieback liner further comprises an annular groove around an outer surface in which the spring is located.

20. The well structure of claim 16, wherein the spring comprises a bellows spring and further comprising another separate cover positioned so that the covers overlap.

* * * * *